United States Patent [19]
Lutz

[11] 4,111,318
[45] Sep. 5, 1978

[54] LOADING AND UNLOADING APPARATUS FOR VEHICLES

[76] Inventor: David Edward Lutz, 300 Washington La., Carlisle, Pa. 17103

[21] Appl. No.: 784,406

[22] Filed: Apr. 4, 1977

Related U.S. Application Data

[63] Continuation of Ser. No. 543,608, Jan. 23, 1975, abandoned.

[51] Int. Cl.² ............................................. B60P 1/36
[52] U.S. Cl. ................................ 214/83.22; 198/817; 214/83.34; 214/85.5
[58] Field of Search ............ 214/82, 83, 38 D, 83.14, 214/83.22, 83.34, 83.36, 85.5, 516, 517; 198/817

[56] References Cited

U.S. PATENT DOCUMENTS

| | | | |
|---|---|---|---|
| 2,606,677 | 8/1952 | Snedeger | 214/83.22 X |
| 2,815,874 | 12/1957 | Kowal | 21/44 R |
| 3,212,657 | 10/1965 | Murfitt et al. | 214/82 |
| 3,272,358 | 9/1966 | Thompson | 214/83.2 |
| 3,937,338 | 2/1976 | Cos | 214/83.36 |

*Primary Examiner*—Robert G. Sheridan
*Attorney, Agent, or Firm*—John J. Byrne; Edward E. Dyson

[57] ABSTRACT

This invention relates to a loading and unloading apparatus for a load-carrying vehicle. The arrangement includes a plurality of cables which are laid on the floor of the vehicle and which support loads placed thereon. The opposite ends of the cables are connected to separate power outputs on the underside of the floor, which power outputs include takeup reels. The cables can be moved in either longitudinal direction on the vehicle floor whereby loads supported on the cables are moved along the vehicle floor to facilitate loading and unloading of the vehicle.

23 Claims, 15 Drawing Figures

LOADING AND UNLOADING APPARATUS FOR VEHICLES

This is a continuation of application Ser. No. 543,608, filed Jan. 23, 1975, now abandoned.

FIELD OF THE INVENTION

This invention relates to a loading and unloading apparatus for a vehicle such as a van or tractor trailer or the like, although it is to be understood that the apparatus has utility in any environment where loads are required to be moved from one position to another whether it be on a warehouse floor, in a railroad car or in the hold of a ship. More particularly, this invention relates to a flexible cable type of loading and unloading apparatus wherein power driven cables are laid on the vehicle floor and support loads placed thereon. When the cables are moved along the vehicle floor, the loads supported thereby are also moved.

BACKGROUND OF THE INVENTION

This invention lies in a highly developed area of the art relating to apparatus for facilitating the loading and unloading of vehicles and the handling of loads within the confines of the vehicles. For the most part, the prior art apparatus provides means whereby loads are actually lifted off of the supporting surface and transferred either into or out of the vehicle. Accordingly, the power and structural requirements of such apparatus are extremely high if the apparatus is to operate efficiently for any substantial period of time. The purpose of this invention is to provide a more simplified apparatus for loading and unloading vehicles having minimum power and structural requirements. Under the general concept of the invention, power-driven cables are stretched over the vehicle floor from front to rear and are movable in either direction in unison. A plurality of cables are used and spaced laterally of the vehicle. The number of cables which are to be used depends upon the size and type load to be handled. The loads are placed directly on the cables and the cables are actuated to shift the loads from front to rear or vice versa as the case may be. The cables ride on the vehicle floor, however, the frictional contact is only a line contact and is substantially less than the contact which would occur if the loads were placed directly on the floor.

At least one other in the prior art has designed a similar system for vehicles. This system is disclosed in U.S. Pat. No. 3,272,358, entitled TRUCK UNLOADING STRUCTURE, dated Sept. 13, 1966, to F. Thompson. Thompson discloses the general concept of using cables on a vehicle floor to shift loads therein. However, it is quite apparent that his arrangement has little utility except for relatively small loads. Thompson employs a plurality of endless cables stretched over a friction surface roll and idlers rolls. The friction roll is driven by a suitable power source. It is quite apparent, however, that the frictional contact between the roll and cable is not sufficient to move loads of any appreciable size and weight. Further, Thompson's particular arrangement of pulleys for supporting the cables is unsuitable for use in trailers having fifth wheel assemblies thereon.

Other arrangements found in the prior art use movable floors or the like comprising flexible planar sheets or floors covering substantially the entire area of the vehicle load-supporting floor. The sheets are wound onto takeup reels positioned on the vehicle. The deficiencies of this arrangement are quite apparent in that use of such a movable sheet or the like provides no relief from substantial frictional contact with the underlying floor of the vehicle. The cables of this invention as mentioned above provide substantially line frictional contact, which is substantially less than that which would be experienced with the use of the movable sheet referred to above. Further, the movable sheet-type arrangements are cumbersome and do not lend themselves to ready adaptability to existing truck bodies, and are likewise unsuitable for use with trailers having fifth wheel coupling assemblies. Further, the apparatus of the prior art generally renders the vehicle inoperative for unloading by a forklift truck, for example, wherein the truck must enter the vehicle. The cable arrangement of this invention cannot be damaged by driving a forklift across the vehicle floor and over the cables.

An objective of this invention is to provide a simplified loading and unloading apparatus for vehicles requiring a relatively low power output for efficient operation.

Further, it is an objective of this invention to provide a loading and unloading apparatus which may be readily installed in existing truck bodies with a minimum of modifications to the truck body.

It is another objective of this invention to combine with a cable type loading and unloading apparatus of this invention a movable bulkhead which is affixed to the cables and movable therewith to assist in pushing loads to the rear of the vehicle, especially lighter loads.

Another objective of this invention is to provide separate power outputs for opposite ends of the cables with each of the outputs having reels or sheaves for receiving the cables. The reels of each power output alternately serve as supply or takeup reels depending upon which power output is energized. This is turn determines the direction of movement of the cables on the vehicle floor.

It is another objective of this invention to provide a loading and unloading apparatus which may be marketed in a compact package and readily installed by the vehicle owner.

It is a further objective of this invention to provide a loading and unloading apparatus having a minimum of parts including the load-supporting cables, the bulkheads, a set of pull-back cables, a power unit including the separate power outputs and separate sets of reels, and the miscellaneous pulleys used to properly space and guide the cables.

SUMMARY OF THE INVENTION

In a preferred embodiment, a plurality of cables are laid out on the floor of a vehicle and extend longitudinally thereof. The number of cables used depends upon the size of the load to be moved; however, it has been found that cables spaced 10 inches or so apart will be suitable for most uses. The cables are attached to a movable bulkhead within the vehicle which extends across the width of the floor. The cables then extend over the rear of the vehicle through suitable guide pulleys or the like and then to a plurality of take up sheaves or reels underneath the vehicle. The width of each sheave is approximately equal to the width of a cable, such that each cable will be wound upon itself in a single plane coil. The purpose of this is to insure uniform windup of the cables. A set of pull-back cables, usually only two are required, are attached to the other side of the bulkhead and extend around pulleys on the front end of the vehicle and then to a pair of windup drums mounted on a shaft on the underside of the vehicle which is selectively connected to a suitable power source. A single power source is provided and a clutch is used to selectively couple the power source to either the shaft and sheaves on which the load supporting cables are wound or to the shaft supporting the drums or reels on which the pull-back cables are wound. In operation, assuming that the bulkhead is at the forward end of the truck and that the load-supporting cables are unwound from their sheaves and cover substantially the entire length of the floor, the load-supporting cable sheaves are energized by actuation of the clutch which couples the shaft supporting the sheaves to the power source. The shaft supporting the pull-back cable drums is in the free wheeling condition. As the load-supporting cable sheaves are rotated, the cables are wound up and, accordingly, the bulkhead is pulled toward the rear of the vehicle. At the same time, any loads which are supported on the cables are moved toward the rear of the vehicle with an assist provided by the bulkhead. As the loads reach the rear end of the vehicle they are removed either manually or by any suitable mechanical means. This now completes the unloading function. When it is desired to load, the clutch is disengaged from the shaft which supports the load-supporting cable sheaves and is connected to the shaft supporting the pull-back cable reels. As the pull-back cables are wound onto their reels, the load-supporting cables are again pulled back toward the front of the vehicle, bringing with them any loads which are placed thereon. It is important to note that separate drive shafts are provided for the load-supporting sheaves and the pull-back cable reels. During operation, these reels must rotate at different speeds if a constant tension is to be maintained on the cables. Also, tensioning means are provided to maintain the cables in uniform tension. The tensioning means is in the form of turnbuckles mounted on the bulkhead to which the cables are attached. The turnbuckles are threadedly adjustable to adjust the tension on the cables. Further, miscellaneous hardware is provided to insure that the cables are properly wound onto their respective sheaves or reels and, further, bearing pads may be provided on the floor of the vehicle to support the cables and to reduce friction.

These and other objects of the invention will become more apparent to those skilled in the art by reference to the following detailed description when viewed in light of the accompanying drawings wherein:

DETAILED DESCRIPTION OF THE PREFERRED EMBODIMENTS

Figure 1:
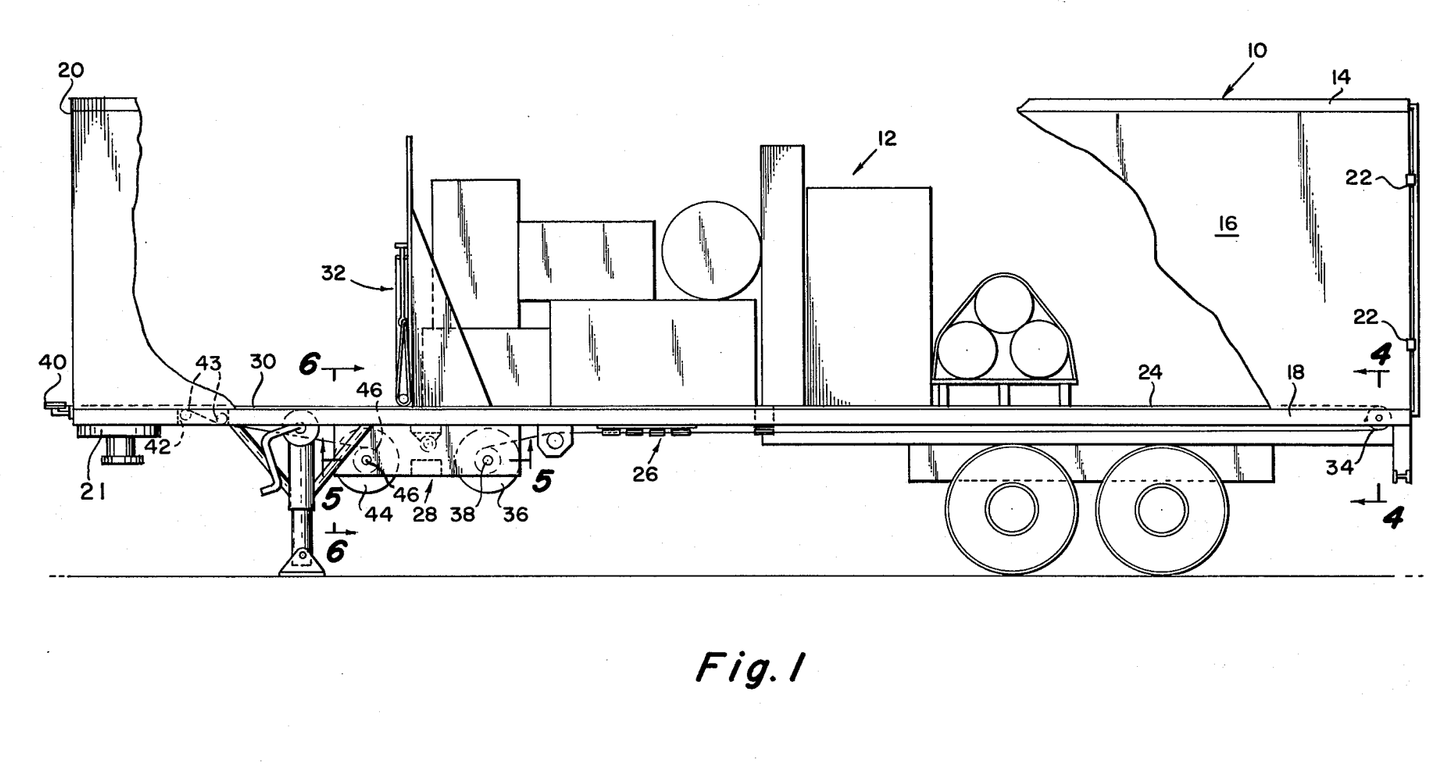
FIG. 1 is a side view in elevation of a conventional trailer equipped with the loading and unloading apparatus of this invention.

Referring now to the drawings wherein like numerals indicate like parts, a truck, in this instance the trailer of a tractor-trailer rig, is generally indicated by the numeral 10 and is loaded with a plurality of items, generally indicated by the numeral 12. The trailer is provided with a ceiling 14, side walls 16 and a floor 18, having a top surface and a bottom surface. For purposes of orientation, the end 20 of the trailer will be referred to as the front end and the end 22 as the rear end. The end 22 is the loading end and the end 20 includes the fifth wheel connection assembly 21. The trailer 10 is provided with the loading and unloading apparatus of this invention which includes the following general parts: the load supporting cables 24, the spacing unit 26, the power unit 28, the pull-back cables 30 and movable bulkhead 32. As will be explained in greater detail below, the load-supporting cables 24 are connected at one end to the movable bulkhead 32 and extend longitudinally over the floor of the vehicle, over end pulleys 34 and then in the reverse direction on the underside of the vehicle through suitable guide pulleys and the spacing assembly 26 and onto takeup sheaves 36 which are mounted for rotation with a power output shaft 38. The pull-back cables 30 are required to pull the bulkhead and the load supporting cables back to the start or forward end position during the loading mode. The cables 30 extend across the floor of the vehicle and around guide pulleys 40 and back through slot 42 in the floor of the vehicle to takeup drums or reels 44 which are mounted for rotation with a power output shaft 46. As will be explained below, the power output shafts are selectively coupled with a single power source means by means of a clutch. When the shaft 38 is coupled with the power source, the sheaves 36 reel in the load supporting cables 24 to pull the bulkhead and the loads 12 supported on the cables toward the rear of the vehicle for unloading. In this phase, the pull back cable reels 44 and shaft 46 are in a free wheeling position. In order to load the vehicle and to pull the bulkhead and load-supporting cables back toward the front of the trailer, the shaft 38 is disengaged from the power source and shaft 46 is engaged. The bulkhead and load supporting cables will be drawn toward the front of the vehicle pulling with them any loads supported on the cables.

Figure 2:
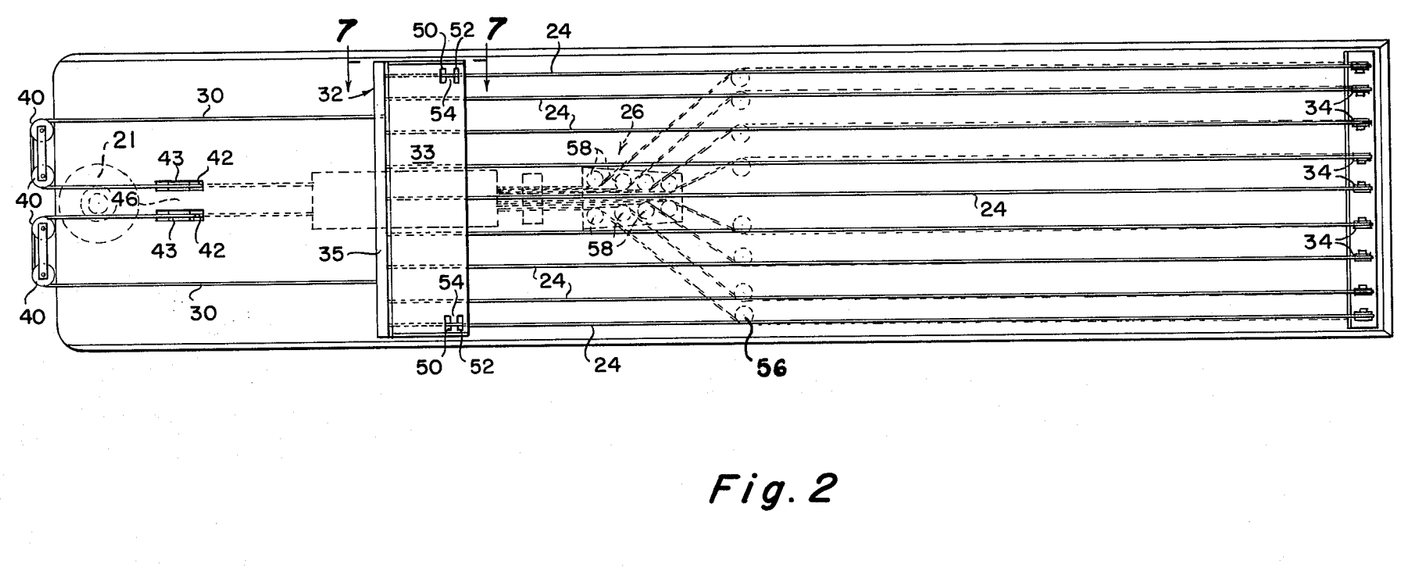
FIG. 2 is a plan view of the floor of the vehicle of FIG. 1 with the loads removed.
Figure 4:
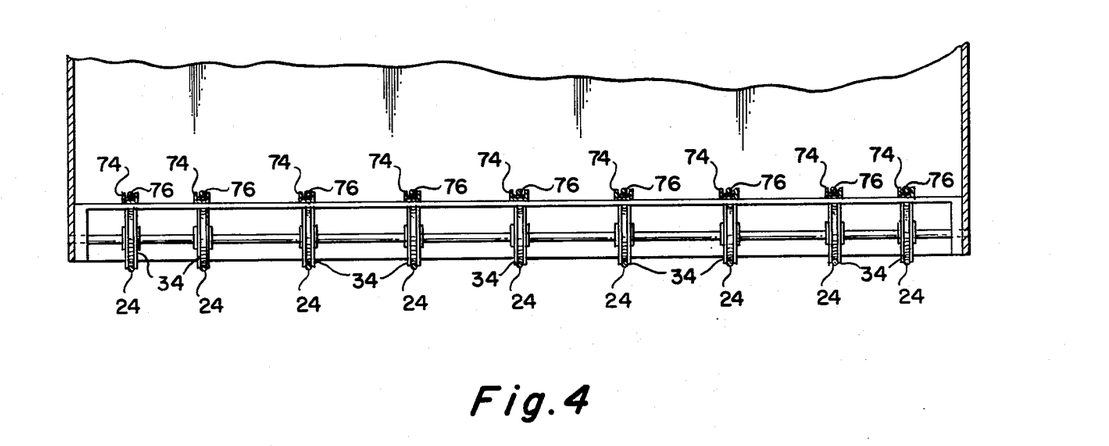
FIG. 4 is a view in elevation of the cable supporting guide pulleys which are mounted on the rear of the vehicle.

FIG. 2 more clearly shows the arrangement of the cables on the floor of the vehicle. The portion of the cables 24 that will lie on the upper surface of the floor are indicated in bold solid lines while the paths which the cables follow beneath the floor of the vehicle are indicated in dotted lines. Likewise, those portions of the pull-back cables 30 which lie on the upper surface of the floor of the vehicle are indicated in solid line while the path of travel beneath the floor of the vehicle is indicated in dotted lines. The cables 24 ride in guide channels which, for clarity, are not shown in FIG. 2 but are shown in FIG. 4. The cables 24 are attached at one end to the bulkhead 32, the latter of which includes a floor portion 33. The cables 24 pass under the floor portion and are attached to tensioning means mounted on the upright portion 35 of the bulkhead in a manner to be explained in greater detail below. The two outermost cables, however, pass through a pair of apertures 50 and 52 on each side of the floor 33 of the bulkhead 32 and over an intermediate portion 54. The purpose of this construction is to hold down the floor of the bulkhead to prevent it from tipping rearwardly.

The cables 24 extend over a series of pulleys 34 journaled on the rear end of the vehicle and then in the reverse direction underneath the vehicle to a plurality of guides 56, one for each cable. These guides serve as spacers. The cables then pass through a series of generally longitudinally oriented pulleys or guides 58 which properly orient the cables prior to their entry onto the individual sheaves to be described below. The guides or pulleys 58 are on axes which are actually arranged in a pair of generally diverging rows extending away from the power unit.

The pull-back cables 30 extend from the bulkhead 35 to which they are affixed and out through the front wall of the trailer and around a pair of guide pulleys 40 and then back into the vehicle, whereupon at a certain distance from the front wall of the vehicle, they exit through apertures 42 in the floor of the vehicle over guide rollers 43 and then, as indicated in dotted lines, to the power unit and the takeup reels 44 therein. The reason for the cables extending out through the front of the vehicle and then back in without going directly to the underside of the vehicle is to avoid the fifth wheel connection which occupies the underside of the trailer in the area adjacent to the front end thereof.

Figure 3:
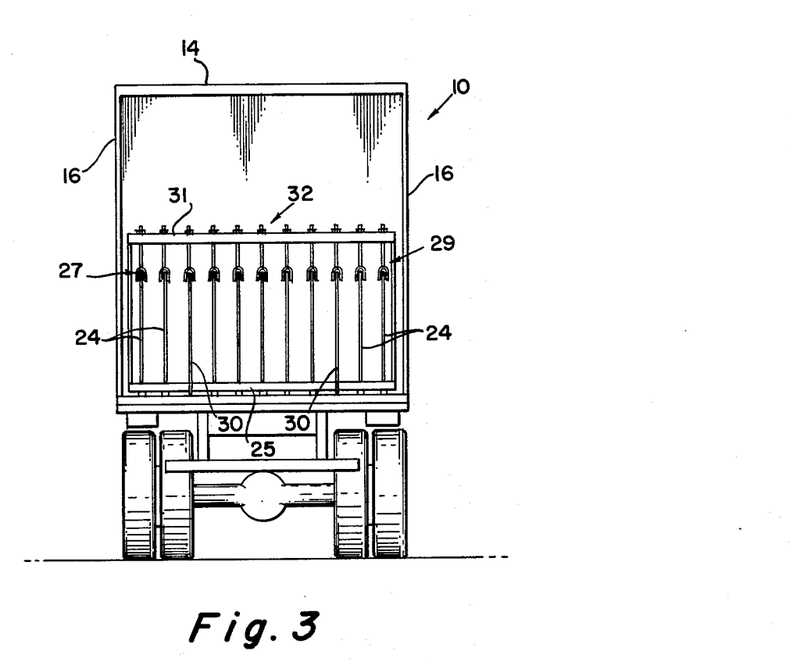
FIG. 3 is a rear view of the vehicle of FIG. 1 with the loads removed.

FIG. 3 is a rear view of the vehicle showing the bulkhead 32 and the tensioning means 29 which will be described in greater detail below. FIG. 4 shows more clearly the guide pulleys 34 which are journaled on the rear end of the vehicle. This figure also shows guide channels 74 in which the load-supporting cables are seated. These guide channels include bearing pads 76 which help reduce friction between the cables and the channels 74.

Figure 5:
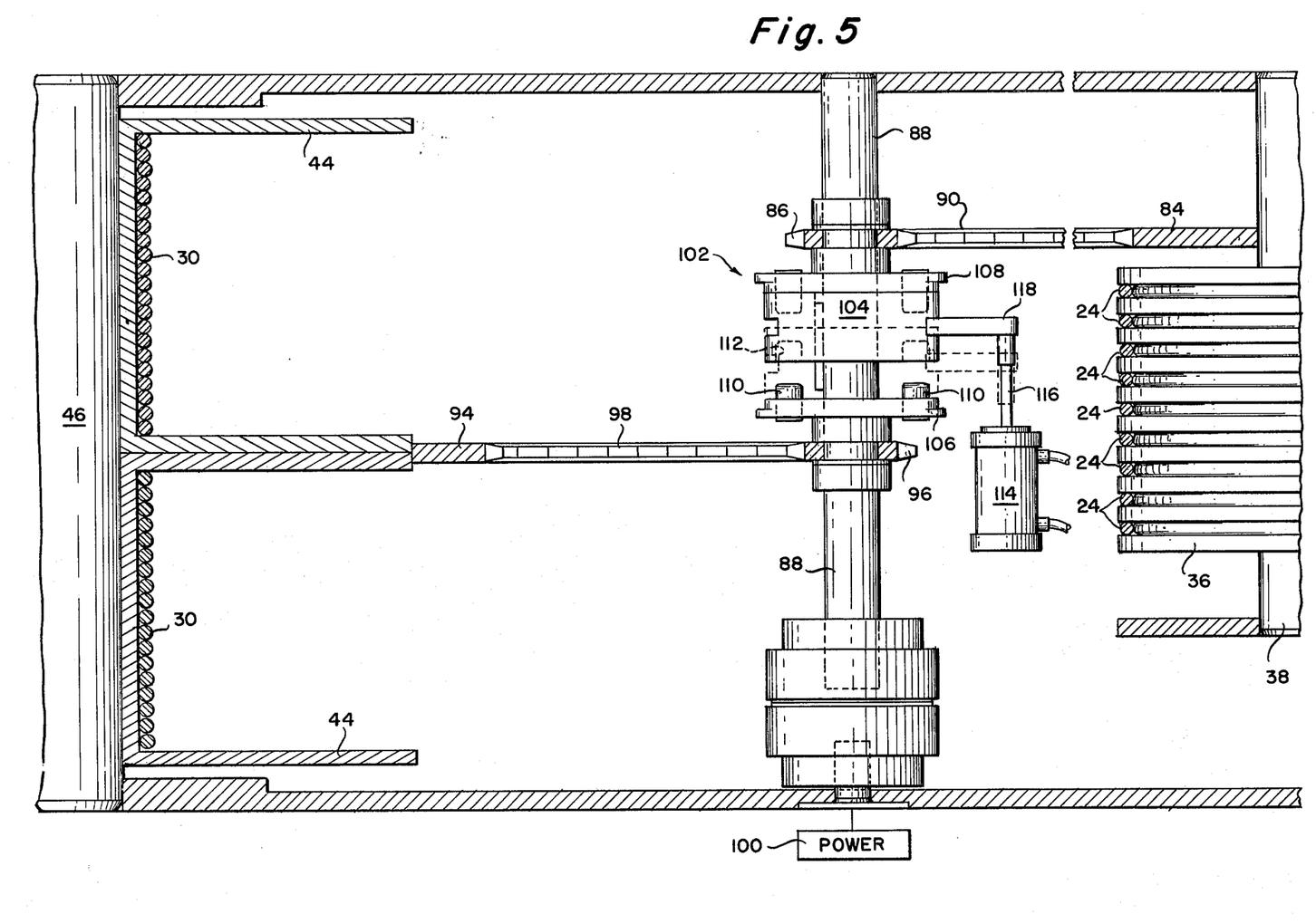
FIG. 5 is a cross sectional view taken along lines 5—5 of FIG. 1.

FIG. 5 shows the power unit and the respective sheaves and take up reels for the load supporting cables and the pull-back cables. The sheaves 36 for the load supporting cables 24 are mounted on shaft 38. It is to be noted at this time that the width of the sheaves is substantially equal to the width or thickness of the cables 24 such that the cables are wound upon themselves in a single planar coil. This arrangement insures even and uniform takeup of all of the cables as they are wound in unison. The sprocket 84, affixed to shaft 38, is drivingly connected by chain 90 to a sprocket 86 which is loosely journaled on a power shaft 88.

The pull-back cables 30 are wound onto drums or reels 44 which are mounted on shaft 46. The sprocket 94, which is connected to the reels 44, is in turn drivingly connnected by chain 98 to sprocket 96 which is loosely journaled on shaft 88. The shaft 88 is connected to a power source 100 which is schematically illustrated. In a preferred embodiment, the power source is a hydraulically actuated motor. As mentioned, the sprockets 86 and 96 are loosely journaled on the shaft 88. The clutch assembly 102 is provided to selectively drive either the reel for the pull-back cables 30 or the sheaves for the load-supporting cables 24. The clutch comprises an intermediate member 104 which is keyed for rotation to the shaft 88 but which is slidable axially thereon. Rigidly connected to the sprocket 96 is a clutch plate 106 and rigidly connected to the sprocket 86 is a clutch plate 108. Each clutch plate is provided with inwardly directed projections 110 which are adapted to be received in recesses 112 on opposite sides of the intermediate member 104. The intermediate member 104 is shifted axially along the shaft 88 by means of a hydraulic piston and cylinder assembly 114. The piston rod 116 is attached to an arm 118 which is affixed to the intermediate member 104.

In the position shown, the clutch is in driving engagement with the sprocket 86 which in turn drives the sheaves for the load supporting cables. When the hydraulic piston cylinder assembly 114 is retracted, the intermediate member 104 will move into engagement with the plate 106 through the interlocking arrangement of the projections 110 and recesses 112 to drive the pull-back cable reels. When one set of reels is being driven, the other set is in a free wheeling condition.

Figure 6:
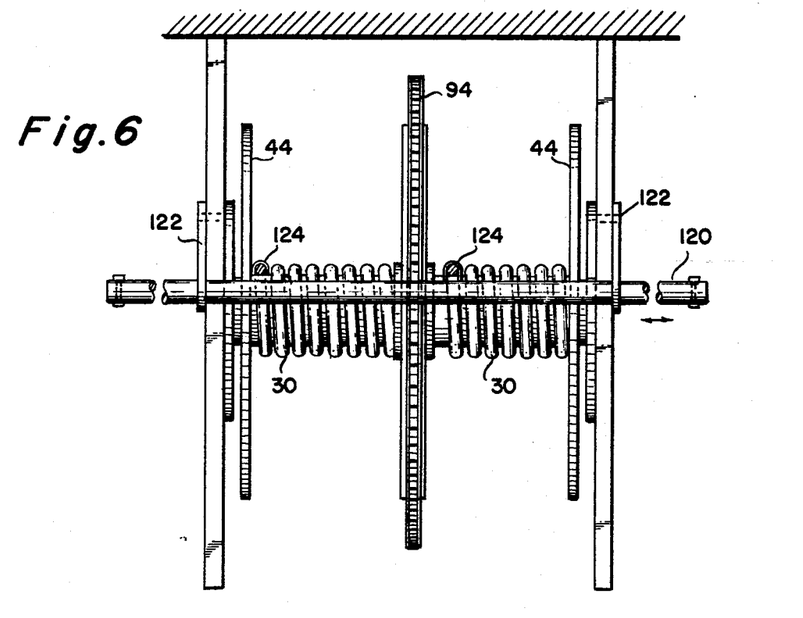
FIG. 6 is a cross sectional view taken along lines 6—6 of FIG. 1.

FIG. 6 shows a front end view of the takeup reels for the pull-back cables which has been described in detail above. However, this particular view shows a traverse bar 120 which is loosely held in side brackets 122 for lateral movement across the face of the reels. The cables 30 pass through eyelets 124 on the traverse bar 120. Accordingly, as the cables 30 are wound onto the reels, the eyelets and traverse bar 120 shift laterally, with the purpose being to insure that the cables are wound evenly onto each reel.

Figure 7:
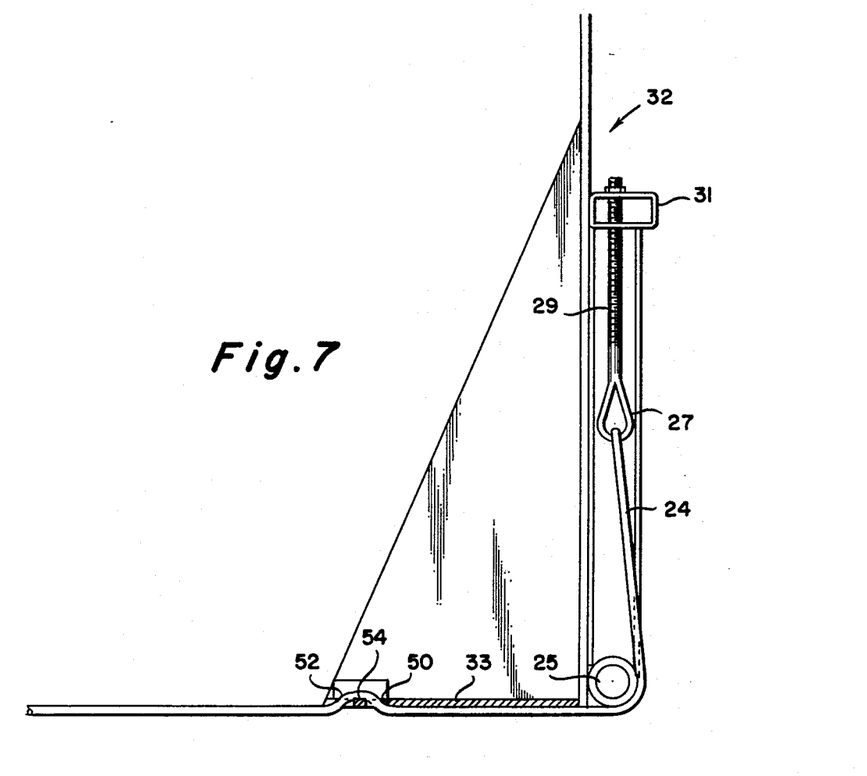
FIG. 7 is a sectional view taken on lines 7—7 of FIG. 2 showing the tensioning means in detail.

Finally, in FIG. 7, a more detailed view of the bulkhead is shown and in particular the cable tensioning arrangement is illustrated. The load-supporting cables 24 as mentioned earlier, pass under the floor portion of the bulkhead and over the bar 25 and are connected to the eyelet portion 27 of turnbuckle 29. The turnbuckle is in turn threadedly received in lateral support bar 31. It can be seen that by adjusting the turnbuckles, the tension on the individual cables can be adjusted. Though not shown, a pair of turnbuckles are also provided on the bulkhead for the pull-back cables 30.

In operation, loads are placed on the load-supporting cables 24 and the reels receiving the pull-back cables 30 are actuated by actuating the clutch means which operably connects the reels to the power source. As the pull-back reels are reeled in, the bulkhead and the load-supporting cables are pulled toward the front of the vehicle bringing with them any loads supported on the cables. To unload the vehicle, the clutch is engaged with the operating mechanism for the sheaves which receive the load-supporting cables, and the load-supporting cables are reeled onto the sheaves thereby pulling the bulkhead and the cables toward the rear of the vehicle bringing with them the loads supported by the cables.

FIGS. 8 through 15 show the loading and unloading apparatus of this invention as modified to permit it to move a load into the vehicle from a loading dock and move the load from the vehicle onto a loading dock. It is to be understood that for the most part, the modifications shown in FIGS. 8 through 15 comprise attachments to the conveyor arrangement described in the earlier figures. In other words, the bulkhead, except as explained below, the arrangement of cables and the power unit are substantially identical to the arrangement shown in FIGS. 1 through 7. For purposes of clarity, details of the basic arrangement are not fully shown in FIGS. 8 through 15.

Figure 9:
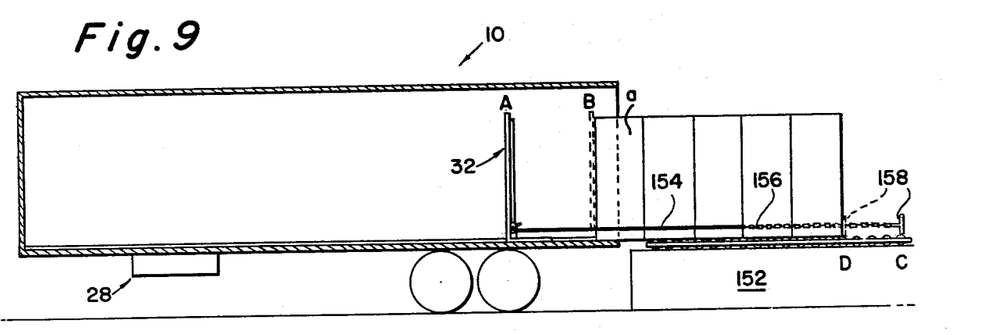
Figure 10:
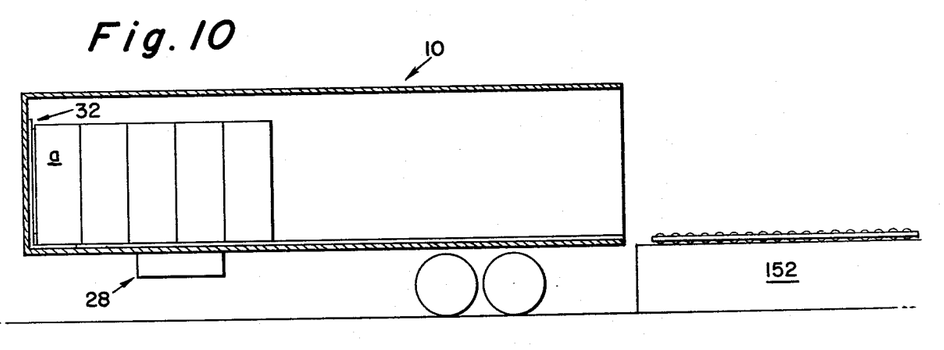
Figure 11:
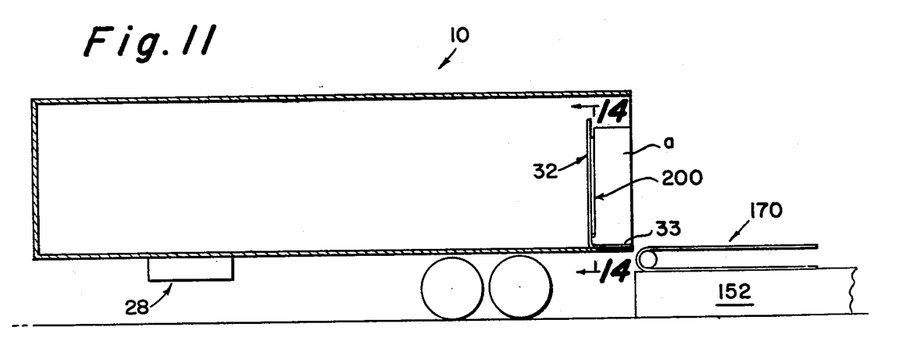
FIGS. 11-13 are diagrammatic views of a further modification showing an unloading sequence.
Figure 12:
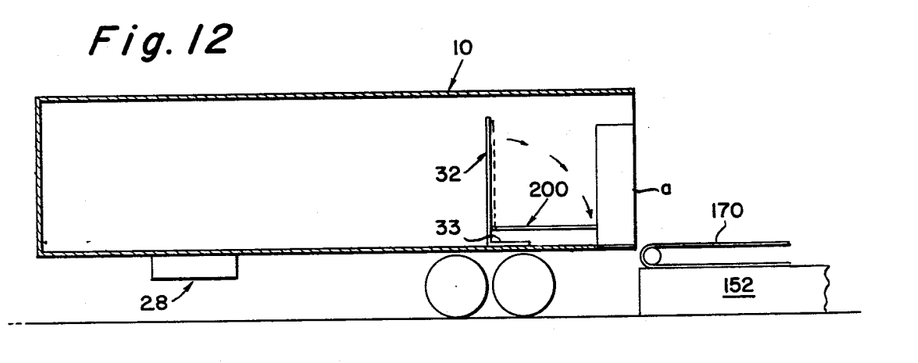

The most significant changes of FIGS. 8 through 15 over the arrangement of FIGS. 1 through 7 is the addition of an arbor or push bar 200 which is swingably attached to the bulkhead 32. The arbor 200 is swingable on horizontal axis on the upright portion of the bulkhead and is movable to a position where it generally overlies the floor portion of the bulkhead and is substantially parallel thereto as illustrated in FIG. 12, from a position substantially flush against and parallel to the upright portion of the bulkhead as indicated in FIG. 11.

Figure 8:
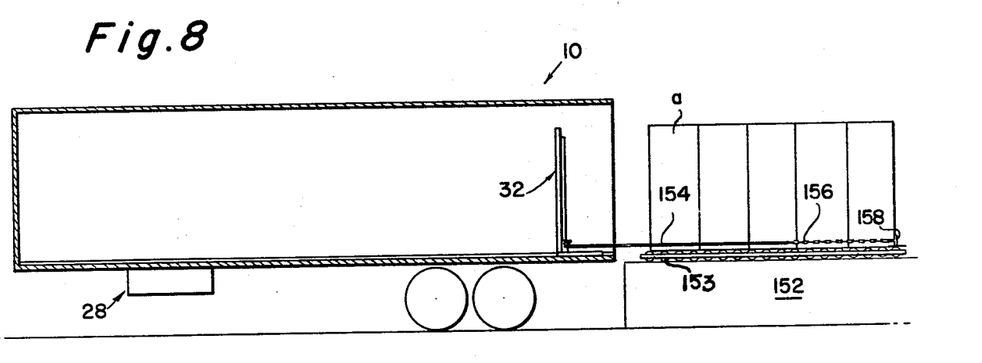
FIGS. 8-10 are diagrammatic views of a modified form showing the loading sequence.

FIGS. 8 through 10 indicate the manner in which a load prepositioned on a loading dock 152 is loaded onto a vehicle. A combination cable 154 and chain 156 is attached to the bulkhead 32 and extends to the rear of the load and is connected to a T-bar 158 which extends across the rear of the load, which in this case comprises a plurality of palletized loads and the like. Since the bulkhead cannot move beyond the rear of the vehicle, there is initially a gap between the bulkhead and the first load unit a. Accordingly, the cable conveyor device is actuated such that the pull back cables pull the bulkhead toward the front of the vehicle whereupon, through the cable and chain arrangement, the load is caused to move toward the vehicle. When it reaches the position shown in FIG. 9, the unit a is partially within the vehicle. The movement is stopped and the drive unit is reversed to move the bulkhead 32 back toward the load until it engages the unit a as indicated in dotted line position in FIG. 9. The cable and chain are then tightened up on the rear such that the T-bar is then flush against the rear of the load whereupon the power unit is energized to move the bulkhead toward the front of the vehicle. The load is drawn with it and assisted in the movement by the cables 24 on the floor of the vehicle as described earlier herein. The vehicle is shown loaded in FIG. 10. The loads shown in FIGS. 8 through 10 are aligned in a pair of longitudinal rows only one of which is shown and the cable extends down the center between the rows to the T-bar which engages the endmost load in each row. It is to be understood that the pair of cables or chains may be used which extend around the loads on each side thereof and toward the rear and are connected to opposite ends of the longitudinal bar extending across the rear. Further, the cables may extend under the load through a suitable channel or the like located in the floor. It is also to be understood that the loading dock is provided with rollers 153, or other conveyor means to support the load for movement as it moves into the vehicle.

Figure 13:
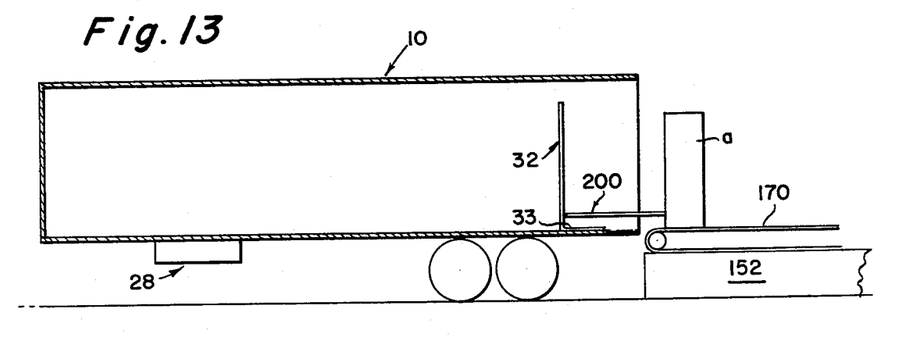
Figure 14:
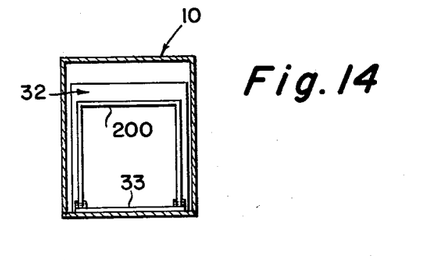
FIG. 14 is a sectional view taken on lines 14—14 of FIG. 11 showing the pushing arbor.
Figure 15:
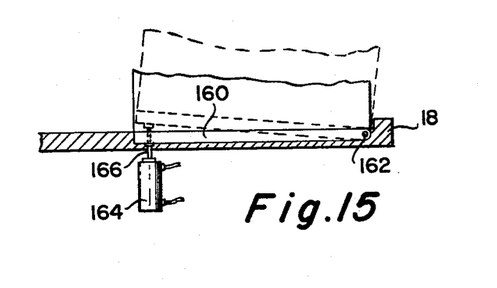
FIG. 15 is a fragmentary sectional view showing one of the lifting plates used to tip the load.

FIGS. 11 through 13 show modifications useful in unloading the vehicle. The cable conveyor is actuated in a manner described earlier in this application to move the load from the position shown in FIG. 10 to the position shown in FIG. 11 wherein most of the load is outside of the vehicle. However, because of the limitation on the movement of the bulkhead with respect to the vehicle, the load a is moved only to the position shown in FIG. 11. Lifters are provided in the floor of the vehicle as shown in FIG. 15. The lifters comprise a series of fingers 160 pivotally attached at 162 in the floor 18 of the vehicle. The fingers are disposed across the width of the vehicle and are interspaced with the cables 24. The fingers 160 are nested in suitable slots in the floor 18. Hydraulic actuators 164 are positioned beneath the floor of the vehicle. The piston rods 166 are attached to the front end portions of the fingers 160. Of course, the piston rod may be provided with a mechanical connection element which enables the use of a single hydraulic unit for a plurality of fingers. In any event, when the load a reaches the position shown in FIG. 11 and cannot be moved any further, the hydraulic unit 164 is activated to pivot the fingers 160 about the pivot point 162 to tilt up the load unit a whereupon the weight is removed from the floor 33 of the bulkhead 32 to permit it to be moved back toward the front of the vehicle and away from the load as indicated in FIG 12. At this point, the arbor 200 is lowered either automatically or manually to the position shown in FIGS. 12 and 13. The arbor, of course, is substantially longer than the floor 33 of the bulkhead and in any event, is of a sufficient length to move a load entirely off of the vehicle even though the bulkhead has reached the limit of its rearward travel within the confines of the vehicle. The arbor 200 is now in a load pushing position such that when the cable conveyor is activated to move the bulkhead toward the rear of the vehicle, the pusher bar or arbor 200 will push the load unit and any preceding loads completely off of the vehicle and onto another conveyor unit 170 on the loading dock 152. In this manner, the vehicle can be fully unloaded.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. A loading and unloading apparatus for a vehicle having a framework, a load carrying floor mounted on said framework, said floor having front and rear ends and a top surface, a set of load supporting flexible strands on said floor extending from first ends longitudinally of said floor over said rear end and in the reverse direction terminating in second ends beneath said floor, a second set of cables extending from first ends on said floor over said front end of said vehicle and in the reverse direction terminating in second ends, interconnecting means connecting the first ends of said sets of strands, first and second drive means positioned beneath said floor, and means connecting said second ends of said first and second sets of strands to said first and second drive means, means for selectively actuating said drive means whereby said load supporting strands are caused to move longitudinally over said floor to move loads supported thereby over said floor, and means for insuring even takeup of said set of load supporting strands.

2. The apparatus of claim 1 wherein said interconnecting means is a bulkhead spanning the width of said vehicle and longitudinally movable with said strands.

3. The apparatus of claim 2 including means for maintaining the bulkhead in the upright position.

4. The apparatus of claim 2 and including a flexible member attached to said bulkhead and adapted to be attached to a pull bar at the rear of a load positioned exteriorly of the vehicle whereby as the bulkhead is moved toward the front of the vehicle the load is pulled onto the vehicle.

5. The apparatus of claim 1 where said flexible strands of each set are metal cables.

6. The apparatus of claim 1 and including longitudinal bearing pads on said floor for supporting said strands.

7. The apparatus of claim 1 and including pulleys on the front and rear ends of said floor receiving said respective sets of strands.

8. The apparatus of claim 7 wherein said vehicle is a trailer having a fifth wheel connection on the underside of the front end thereof, said floor having at least one opening behind said fifth wheel connection, and said second set of strands extending around said pulleys on the front end of said trailer and in the reverse direction on said top surface and then through said opening to said second power output beneath said floor.

9. The apparatus of claim 1 wherein said first drive means includes a rotating shaft, and said means for insuring even takeup comprises a plurality of takeup sheaves on said shaft, one for each strand of said first set, said strands being wound on and unwound from said sheaves upon actuation of said drive means, each of said sheaves being of a width substantially equal to the width of the strand it receives such that the strands are wound on themselves in a single plane coil.

10. The apparatus of claim 9 wherein each of said sheaves is of a width substantially equal to the width of the strand it receives, such that the strands are wound on themselves in a single plane coil.

11. The apparatus of claim 9 and including means beneath said floor between said rear end and said first drive means for separating and spacing said strands.

12. The apparatus of claim 11 wherein said separating and spacing means comprises a plurality of laterally spaced pulleys on the underside of said floor.

13. The apparatus of claim 1 and including means for selectively tensioning said strands of each set individually.

14. The apparatus of claim 13 wherein said tensioning means are mounted on said interconnecting means, said interconnecting means comprising a framework extending transversely of said floor and having turnbuckles thereon for receiving the ends of said strands of each set, said turnbuckles being threadedly adjustable to adjust the tension of said strands.

15. The apparatus of claim 1 wherein said second drive means comprises takeup drums for receiving said second set of strands and transverse means for insuring even takeup and level winding of said strands on said drums.

16. The apparatus of claim 1 and including a single power source means and clutch means for selectively coupling said power source means to said first and second drive means 17. The apparatus of claim 16 wherein said power source is a fluid motor.

18. The apparatus of claim 16 wherein said power source is an electric motor.

19. The apparatus of claim 1 and including a power source for each drive means.

20. A loading and unloading apparatus mounted on a base, said base having front and rear ends and a top surface, a set of load supporting flexible strands on said base extending from first ends longitudinally of said base over said rear end and in the reverse direction terminating in second ends beneath said base, a second set of cables extending from first ends on said base over said front end and in the reverse direction terminating in second ends beneath said base, interconnecting means connecting the first ends of said sets of strands, first and second drive means positioned beneath said base, and means connecting said second ends of said first and second sets of strands to said first and second drive means, means for selectively actuating said drive means whereby said load supporting strands are caused to move longitudinally over said base to move loads supported thereby over said base, and means for insuring even takeup of said set of load supporting strands.

21. A loading and unloading apparatus for a vehicle having a framework, a load carrying floor mounted on said framework, said floor having front and rear ends and a top surface, a set of load supporting flexible strands extending longitudinally of said vehicle and over said floor, opposite ends of said strands extending over the front and rear ends of said vehicle and connected to first and second drive means positioned beneath said floor, means for selectively actuating said first and second drive means whereby said load supporting strands are caused to move longitudinally over said floor to move loads supported thereby over said floor, and means for insuring even takeup of said strands on said first and second drive means.

22. A loading and unloading apparatus for a vehicle having a framework, a load-carrying floor mounted on said framework and having front and rear ends and a top surface, a fifth-wheel connection on said framework beneath the portion of said top surface adjacent said front end, a set of flexible strands having a load-supporting portion on said top surface and extending longitudinally of said vehicle between said front and rear ends, said set of load-supporting flexible strands having a return non-load-supporting portion, drive means supported by said framework for shifting said load-supporting portion of said set of flexible strands longitudinally of said top surface, said return portion of said set of flexible strands having a section extending back from said front end in substantially the same horizontal plane as said load supporting portion and above said fifth-wheel connection at least to a point behind said connection for purposes of avoiding said connection.

23. The apparatus of claim 22 wherein said drive means is positioned on the underside of said framework and wherein the portion of said return behind said fifth wheel extends through said floor to said drive means.

* * * * *